(12) United States Patent
Prater et al.

(10) Patent No.: US 7,050,938 B1
(45) Date of Patent: May 23, 2006

(54) PACKAGE HANDLING SYSTEM

(75) Inventors: Alexander C. Prater, Seattle, WA (US); Suzanne C. Reynolds, Lexington, KY (US); Mackenzie Smith, Issaquah, WA (US)

(73) Assignee: Amazon Technologies, Inc., Incline Village, NV (US)

(*) Notice: Subject to any disclaimer, the term of this patent is extended or adjusted under 35 U.S.C. 154(b) by 23 days.

(21) Appl. No.: 10/960,448

(22) Filed: Oct. 6, 2004

Related U.S. Application Data

(63) Continuation-in-part of application No. 10/827,614, filed on Apr. 19, 2004.

(51) Int. Cl.
 *G06F 15/00* (2006.01)
 *G06F 11/30* (2006.01)

(52) U.S. Cl. .................. 702/182; 702/81; 702/82; 702/174; 702/185

(58) Field of Classification Search ............ 702/81, 702/82, 84, 173, 174, 179, 182, 185; 177/50, 177/200; 340/574, 691.5, 691.7
See application file for complete search history.

(56) References Cited

U.S. PATENT DOCUMENTS

| | | | |
|---|---|---|---|
| 3,651,465 A | | 3/1972 | Law et al. |
| 5,123,494 A | * | 6/1992 | Schneider ............ 177/50 |
| 5,635,906 A | * | 6/1997 | Joseph ............ 340/572.3 |
| 6,522,945 B1 | | 2/2003 | Sleep et al. |
| 2003/0176942 A1 | | 9/2003 | Sleep et al. |
| 2005/0198920 A1 | * | 9/2005 | Nakagawa et al. ........ 53/64 |

FOREIGN PATENT DOCUMENTS

WO   WO 9809598   3/1998

OTHER PUBLICATIONS

"HI-SPEED", Hi-Speed Checkweigher Co., Inc. hispeedcheckweigher.com, accessed Jan. 16, 2004, 2 pages.
"Counting mass-produced parts: ready for tomorrow's electronic data handling", effeff Fritz Fuss GmbH & Co., Albstadt-Ebingen, Germany, 2 pages.
"Cargoscan", Cargoscan AS, Oslo, Norway, www.cargoscan.com/mindex.asp, accessed Jan. 16, 2004, 2 pages.

(Continued)

*Primary Examiner*—Bryan Bui
(74) *Attorney, Agent, or Firm*—Perkins Coie LLP

(57) ABSTRACT

A package handling system for use with a plurality of packages having package identification thereon. The system of one embodiment comprises processing stations where packages having heterogeneous contents are processed. One or more identifiers are positioned at the processing stations to detect the package identifications associated with the packages. A controller is coupled to the identifier to receive identification information about a package and detected by the identifier. The controller is coupled to the data input device to receive first package data related to an actual condition of the package. The controller has second package data related to acceptable package conditions. The controller uses the first and second package data to determine if the package is in a kickout condition. The controller can receive second package data from the independent data sources for comparison with the first package data, the controller automatically initiates processing instructions related to the processing of the package or feedback communication with at least one of the data sources.

51 Claims, 6 Drawing Sheets

OTHER PUBLICATIONS

"Sucess Stories", Hi-Speed Checkweigher Co., Inc., Ithaca, New York, hispeedcheckweigher.com/success.htm, accessed Jan. 16, 2004, 9 pages.

"Weighing Systems", Fuller Weighing Systems, Webb City, Missouri, www.fullerweighing.com/checkweigher.htm, accessed Jan. 16, 2004, 2 pages.

"Industrial Weighing", Mettier Toledo International, Inc., United States, www.mt.com/mt/filter_line/apf.jsp?m=t&r=Y2NTU3MzcwMS1DfDu2NjU1NzM3DEtQwiiNz, accessed Jan. 16, 2004, 2 pages.

"SmartPack Pack Verification & Shipping Module Enables Distribution Improvements", Smartlinc, Millwaukee, Wisconsin, www.smartlinc.net/pvsm.html, accessed Dec. 23, 2003, 2 pages.

"Inventory Control", Mettler-Toledo International, Inc., United States, www.mt.com/mt/filter_link/af.jsp?m=t&r=YzNDU3MzcwMS1BfDc2NjUNzM3MDEtQ3w1NjY1Nz-AxLUMi_T, accesssed Jan. 16, 2004, 2 pages.

"Weighing Systems", Ashtree Label Systems, Ireland, www.ashtreelabels.com/weighing.htm, accessed Jan. 16, 2004, 8 pages.

Loma Systems, "The AS Range - Checkweighing," accessed Jul. 12, 2004, from Loma Systems website: www.loma.com/prod_lit/pdf_files/as range uk.pdf 6 pages.

Hartman, L., "Weighing Keeps Food Packaging Costs in Check," Packaging Digest, Jun. 2004, accessed Jul. 12, 2004, from Packaging Digest website: www.packagingdigest.com/articles/200406/36.php 4 pages.

Loma Systems, "Product Information: Information Systems," accessed Jul. 12, 2004 from www.loma.com/info_systems/index.html 1 page.

* cited by examiner

PACKAGE HANDLING SYSTEM

CROSS-REFERENCE TO RELATED APPLICATION(S)

This application is a continuation-in-part of U.S. patent application Ser. No. 10/827,614 entitled AUTOMATICALLY IDENTIFYING INCONGRUOUS ITEM PACKAGES, filed on Apr. 19, 2004.

TECHNICAL FIELD

The following disclosure relates generally to package processing systems, and more particularly to automated package processing systems that prepare packages for shipping.

BACKGROUND

Many companies package groups of items together for a variety of purposes. For example, e-commerce and mail-order companies package and ship consumer items (e.g., books, CDs, apparel, food, etc.) to fulfill orders from customers. Some companies allow customers to order from a wide variety of product categories such as books, compact discs, electronics, kitchen or housewares, apparel and accessories, toys and games, home and garden products, medical supplies, etc. Multiple different products can be packed in a single package. A common concern with such packages having heterogeneous contents involves ensuring that the packages are properly packed, processed, and completed prior to shipping the package to the customer.

A single package handling system can automatically process a large number of packages having different sizes, contents, packaging requirements, labeling requirements, shipping requirements, and shipping destinations. The packages must be processed and shipped accurately in accordance with the customer's order. Accurate package processing helps build and maintain customer retention, goodwill, inventory control, tracking, cost-effectiveness, and efficiency. The packages must also be shipped in accordance with the appropriate laws and regulations. As an example, packages having potentially hazardous contents or a potentially hazardous combination of contents cannot be shipped via air delivery in accordance with certain shipping regulations. The costs associated with incorrectly processed or shipped packages (e.g., handling customer support calls and item returns for packages shipped to customers) can be high, thereby decreasing the overall business profitability.

One technique used to maintain accuracy in package processing involves manual review of all packages prior to shipping. Such manual review, however, is typically inefficient, cost-prohibitive, and prone to human error. Another technique used in package processing includes automatically tracking packages with scanners and bar codes as the packages are packed, inspected, closed, weighed, wrapped, labeled, etc., prior to shipping. The automated processing systems are typically set up to identify any packages not properly processed and to remove those packages from the processing line. After those packages are "kicked out" from the processing line, the packages can be reprocessed into proper condition for shipping to the customer.

In some systems, a kickout label is applied to a kicked-out package to indicate that the package has been incorrectly or incompletely processed. The kickout labels, however, provide little or no information about how to properly reprocess the package. Accordingly, a line-worker typically must manually identify the problem and initiate the correct reprocessing steps for the package. Such manual reprocessing of kicked-out packages can be labor-intensive, expensive, and inefficient. Such reprocessing of the kicked-out packages typically does not address the root problem causing package kickout. Therefore, there is a need for an improved package handling process.

DETAILED DESCRIPTION

The present disclosure describes automated package processing systems that prepare packages for shipping to end users. Several specific embodiments are set forth in the following description and FIGS. 1–6 to provide a thorough understanding of certain embodiments of the invention. One skilled in the art, however, will understand that the present invention may have additional embodiments, and that other embodiments may be practiced without some specific features explained in the following descriptions.

Figure 1:
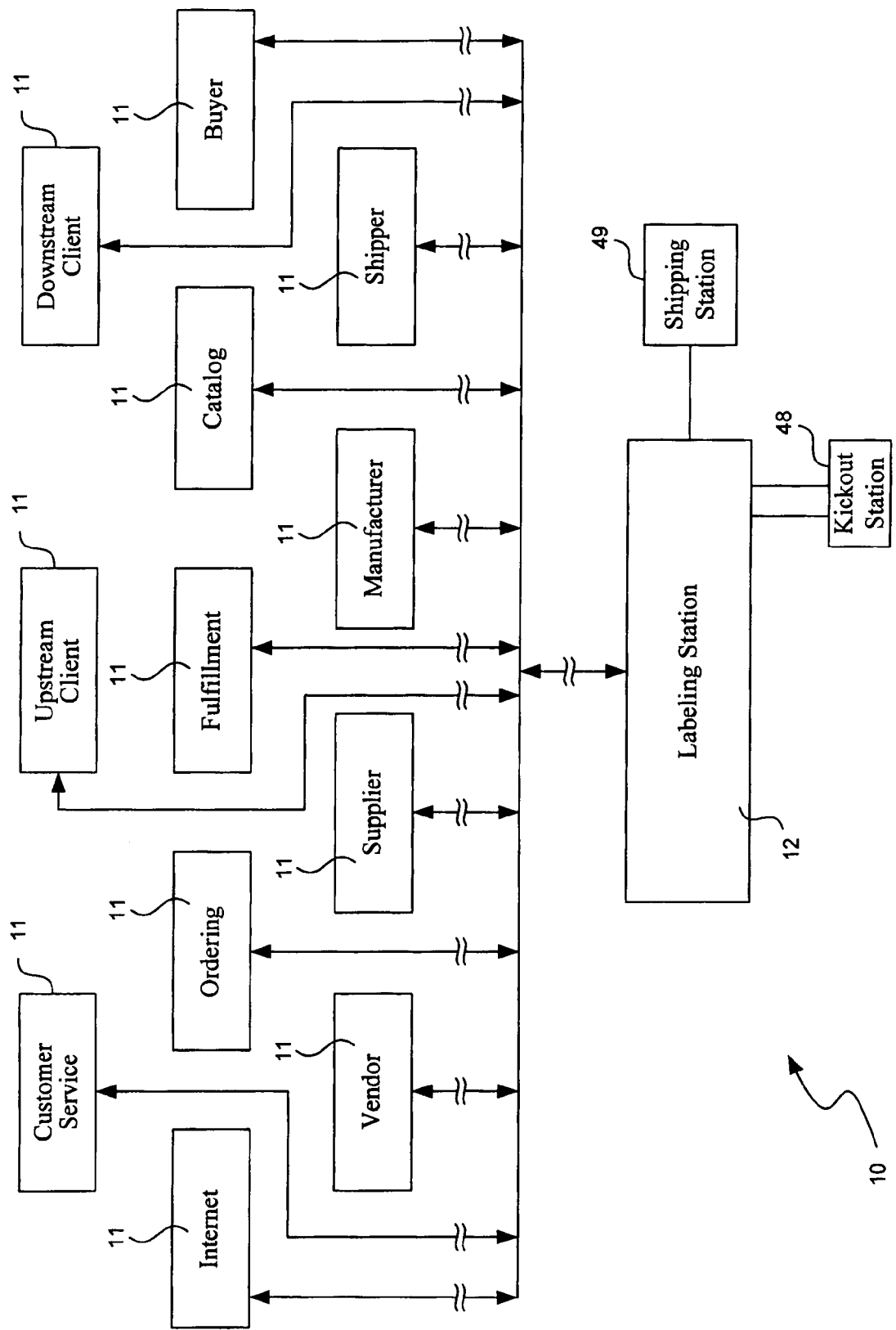
FIG. 1 is a schematic diagram of an open system for purchasing, packing, tracking, and shipping packages packed with potentially heterogeneous contents in accordance with one embodiment of the invention.

FIG. 1 is a schematic diagram of a package processing system 10 having a kickout system in accordance with one embodiment of the present invention. The system 10 shown and described herein is one type usable by a company selling, packing, and shipping a wide variety of products from one or more product categories. The system 10 is particularly well suited for a complex, open e-commerce company capable of shipping packages containing virtually any combination of its products, thereby providing accurately packed packages containing heterogeneous items for shipment to a customer virtually anywhere in the world.

In the illustrated embodiment, the system 10 is operatively coupled to a plurality of entities for open bi-directional communication of information related to the processing, fulfilling, and completing the processing of customer orders for products. The system 10 can be configured for communication between any one of a vast array of third party (external) data sources, including vendors, product suppliers, product manufacturers, shipping services, or Internet-related services. The system 10 can also be configured for communication between internal data sources, such as a product buyer, catalog department, an order fulfillment department, product ordering department, customer service department, package kickout department, system management department, or facilities department. The system 10 can be operatively coupled to various stations and areas within the system or to virtually any other upstream or downstream data source 11.

The system 10 can receive information or data from any one of the data sources 11 that may affect how the system should process, fulfill, pack, process, complete and/or ship a customer order. As discussed in greater detail below, the system 10 is also configured to provide feedback and feed-forward information to one or more of the data sources 11 to initiate a change or quality control check related to the packing, handling, and processing of packages with heterogeneous contents. The system 10 can also be configured to provide various self-correcting quality control processes, quality control checks, anti-theft procedures, and timely package processing and shipping to customers with a minimum amount of human intervention.

Figure 2:
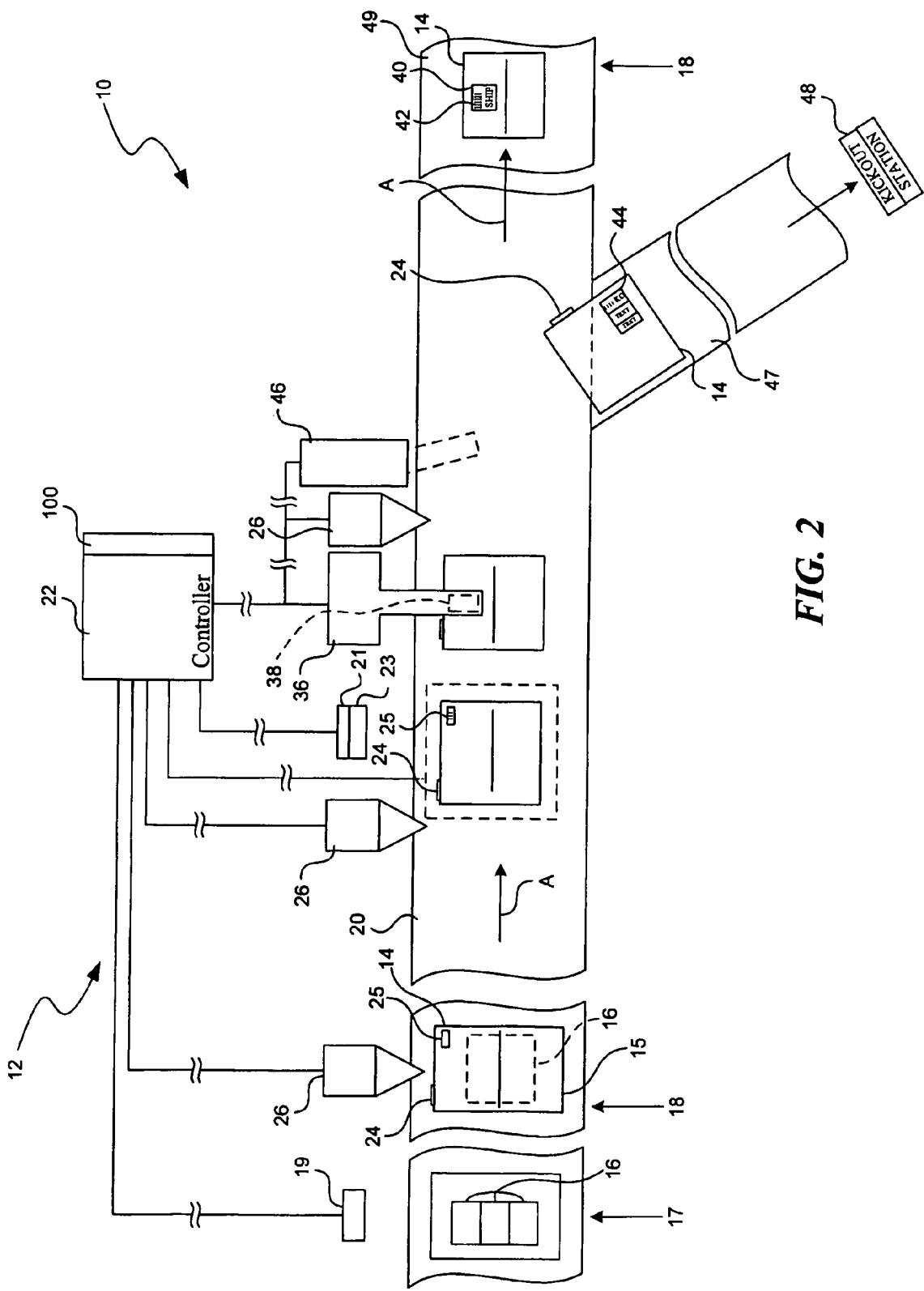
FIG. 2 is an enlarged schematic, partial top plan view of a package processing system having a labeling station in accordance with an embodiment of the present invention.

FIG. 2 is an enlarged schematic, partial top plan view of the package processing system 10 of FIG. 1 having a labeling station 12. The package processing system 10 of the illustrated embodiment is only one example of a system that may be used as part of a complex open distribution operation for an organization that ships large numbers of packages 14 with potentially heterogeneous contents to customers or other end users. The system 10 of the illustrated embodiment has a plurality of stations 18 at which the packages 14 undergo different process steps prior to shipment to the customer. For example, a station 18 may be provided where various items 16 ordered by a customer are collected, compared to the order, analyzed dimensionally for best packing procedures, and packed into a shipping box to define a package 14 that will undergo further processing downstream from the packing station. Packages 14, once dimensionally analyzed and packed, move along a processing path 20 in the direction of travel shown by arrow A in FIG. 2. The packages 14 move through sequential stations 18, including the labeling station 12, to prepare the package for shipping to the customer.

As the packages 14 move along the processing path 20 and undergo processing steps, a controller 22 tracks the progress of each package at each station 18. The controller 22 can be, for example, a suitably programmed computer system. The computer system may be a computing system and/or include one or more central processing units ("CPUs") for executing computer programs; a computer memory for storing programs and data—including data structures—while they are being used; a persistent storage device, such as a hard drive, for persistently storing programs and data; a computer-readable media drive, such as a CD-ROM drive, for reading programs and data stored on a computer-readable medium; and a network connection for connecting the computer system to other computer systems, such as via the Internet, a wide-area network or local-area network, to exchange programs and/or data—including data structures. While computer systems configured as described above are typically used to support the operation of the facility, one of ordinary skill in the art will appreciate that the facility may be implemented using devices of various types and configurations, and having various components. The controller 22 also receives data about each processing step applied to each package at each station. In one embodiment, each package 14 has a side label 24 and a top label 25, each with a bar code (one or two dimensional) or other symbology or other identifier unique to that package. One or more readers 26 are positioned to scan the side label 24 as the package 14 moves through a station 18. Data from the reader 26 is provided to the controller 22 related to the specific package 14 and the actual process steps performed on the package at that station. Data related to the package processing can also be provided to the controller 22 by manual input from a station operator via a keyboard, keypad, or other data input device.

In another embodiment, the package 14 and its contents can be identified by the controller via a unique Radio Frequency Identification (RFID) tag on or in the package. Each item 16 in the package 14 can also have its own unique RFID tag. The RFID tag can be "read" by a reader at each station. Accordingly, a reader at one station 18 coupled to the controller can detect which package 14 has entered the station and what items 16 are in the package in a non-invasive manner by detecting and reading the RFID tags associated with that package. Other embodiments can use other identification tags or other unique identifiers from which identification data can be obtained to identify the actual package 14 entering the station 18 and the actual items 16 within the package. In other embodiments, different identification systems can be used to non-invasively identify the packages 14 and the contents. In yet other embodiments, non-invasive visual identification systems could be used, such as X-ray, magnetic resonance imaging (MRI), optical imaging, or the like to non-invasively identify packages 14 and actual contents of the packages.

The controller 22 has a database with the relevant actual and expected information about each package, including information about the customer's order, the customer's past order history (if any), the shipping information, the contents for each package, optional brand data, and whether the package needs to be gift-wrapped or over-wrapped. The controller 22 also includes data about the processing steps expected to be applied to each package 14 before the package is shipped to a customer. The controller 22 also contains information in the database related to each of the items 16 in each package. For example, the data can include the weight of the item, the dimensions of the items, the fragility of the items, whether those items are in stock at the facility, whether brand data needs to accompany the items, and whether special packaging or shipping is required. It will be appreciated by those of skill in the art that the database of controller 22 can be implemented as one or more databases, and that such database or databases can be integral to controller 22, or can be separate from and connected to controller 22, as by a local- or wide-area network.

The controller 22 can also include a wide variety of other information about items 16 available to a customer. For example, the controller 22 can include information about whether the items 16 alone or in combination are designated by the U.S. Department of Transportation (DOT) as a "hazardous material" or an Other Regulated Material DOT (ORMD) consumer commodity, thereby being subject to special packaging and shipping requirements. The controller 22 can also include information about any product recall by a manufacturer a customer's history of past returns, previous customer complaints, or other information about items or the combination of different items when combined into a package. The controller 22 can also include expected data about the package 14, including an estimated package weight (including the items, box, dunnage, wrapping, etc.) and size required to accommodate the items 16 to be packed in the package. The controller 22 can be updated regularly via communications and data transfers with the data sources 11 discussed above and other upstream or downstream entities. As discussed below, the expected data can be compared to the actual package data to help determine whether the package 14 is ready for shipping to the customer.

In the illustrated embodiment, the package 14 is packed and created at a packing station 17 along the processing path 20. The packages 14 can be packed with the items 16 by humans or by one or more automated packing machines. At the packing station 17, the packers pack the items 16 into a selected shipping box 15, packed with dunnage as needed, sealed closed, and moved along the processing path toward the labeling station 12 where shipping labels 40 can be applied to the package if in acceptable condition before proceeding to a shipping station 49. In one embodiment, a sensor 19 is associated with the packing station 17 for obtaining information about items 16 placed into the box. The sensor 19 can be optical, RFID, or other sensor that allows the packer to determine whether the correct items 16 have been packed into the shipping box.

In one embodiment, the packing station 17 is coupled to the controller 22 and in communication with an order fulfillment department. The fulfillment department has the customer order information and provides to the packing station 17 the items 16 ordered by the customer. The controller 22 also includes data about the ordered items 16, which can be used for efficient and safe packing of the package 14. The controller 22 includes a database with dimensional data about each item and also about the plurality of shipping boxes available for use when packing at the packing station. The controller 22 is configured to analyze the dimensional data of the ordered items 16 and determine the minimum size shipping box needed for properly packing all of the ordered items. This dimensional analysis helps avoiding packing items in an over-sized box, which would typically be more expensive than using a smaller box.

The controller 22 can also include other data about the items 16 or combination of items that may affect how the items should be properly packed for safe shipment to the customer. As an example, the controller 22 can include manufacturer's information about fragility of items or special packing instructions for certain items. Based in part upon the fragility of the items, which items are to be packed together in the shipping box, and the size of the shipping box, the controller 22 can be configured to determine how much dunnage may be required to protect the particular items 16 from damage during shipment. The controller 22 can also be configured to provide packing restrictions that prohibit certain items or classification of items from being packed together. As an example, if a customer orders several items 16, of which one is particularly fragile, the combination of the items in a box could result in damage to the fragile items (e.g., the packing together of fragile glassware and a hammer). The controller 22 can use the fragility data for the combination of items and automatically provide instructions to the packing station about using more dunnage or perhaps requiring the use of separate smaller packing boxes to separate the fragile item(s) from the less fragile item(s).

The controller 22 can also be configured to automatically run a dimensional analysis to determine the dimensions of the items (alone and in combination), the volume of dunnage required to safely pack the items, and whether there are any size-related restrictions on packing the items together in the same package. The controller 22 can then send instructions to the packing station 17 about the appropriate size of shipping box required for the package. The use of the dimension data, fragility data, and other particular shipping considerations allows for the smallest box to be used for each package, thereby saving significant costs and expenses that can occur from using unnecessarily large shipping boxes and excess dunnage. This also helps eliminate or substantively reduce the risk of customer returns due to product damage due to inappropriate packing of the items.

The controller 22 can also be configured to provide a branding analysis for a package wherein the package is to be shipped under or in conjunction with a plurality of brand names. The controller 22 compares actual data about brand information placed into or onto a package with the expected data about the brand information that should have been placed into or onto the package. The controller 22 can determine whether the package contains the correct brand information.

The controller 22 is also configured to receive feedback information from the packing station 17 about the items being packed and the shipping box. In one embodiment, the controller 22 receives actual data from conventional data input devices at the packing station 17 related to the items 16 and dunnage in the package 14. The input devices can be keypads for manual data input, scanners, readers, optical imaging devices, or other identification technologies. For example, the controller 22 can receive feedback data from the packing station 17 if the designated shipping box appears to be too small, too large, or otherwise inappropriate to accommodate all of the items and dunnage. The controller 22 can then automatically initiate communication with an upstream data source 11, such as the vendor, a fulfillment department, a manufacturer, etc., to validate or update the dimensional data or fragility data for the designated items. The controller 22 can also maintain historical records from the packing station 17 to monitor and correct recurring packing issues. The controller 22 can also use the actual data about the package 14 during downstream processing of the package along the processing path 20.

The controller 22 is configured to use the actual data about the package 14, the items 16, the dunnage, or other aspects about the package in a self-correcting process to automatically modify data in the controller 22 about expected conditions for items 16 or package 14. As an example, the controller 22 can be configured to automatically update its data about the appropriate shipping box and dunnage for a particular combination of heterogeneous items 16. The controller 22 self-corrects its data based upon actual historical data from previously processed items 16 and packages 14. Accordingly, the controller 22 could, as an example, subsequently instruct a packer at the packing station 17 to use a larger or smaller shipping box with more or less dunnage the next time substantially the same combination of the heterogeneous items 16 are to be packed into a package 14 for a customer.

After the package 14 has been packed, it is taped or otherwise sealed and moved along the path 20 toward the labeling station 12. As the package 14 enters the labeling station 12, the side label 24 is scanned by the first reader 26 positioned adjacent to the processing path 20. The first reader 26 is coupled to the controller 22 and provides data to the controller indicating that the particular package 14 is entering the labeling station 12. As discussed above, in an alternate embodiment, the reader can be a RFID reader or other type of reader coupled to the controller that can uniquely and non-invasively identify the particular package 14 and perhaps its actual contents. The package 14 then moves over a scale 34 that weighs the package and provides package weight data to the controller 22. The controller 22 compares the actual weight of the package 14 to an expected weight for that package. The controller 22 determines whether the package 14 is properly packed based upon the package's actual weight. In one embodiment, the controller 22 determines whether the package 14 is properly packed using the software facility described in co-pending U.S. patent application Ser. No. 10/827,614, entitled "Automatically Identifying Incongruous Item Packages," filed on Apr. 19, 2004, from which priority is claimed.

After the package 14 is weighed, it moves to a position adjacent to a labeler 36, which is coupled to the controller 22. The labeler 36 is configured to apply one of a plurality of labels 38 to the top of the package 14. The controller 22 compares data about the actual package weight and processing steps applied to the package 14 to the data about the expected package weight and processing steps for that particular package to determine if the package 14 appears ready to be shipped to the customer.

The controller 22 is also configured to automatically provide other quality control checks on the package. The controller 22 determines if data in the database related to the package indicates that the package 14 is not in proper condition to ship or may require one or more additional quality control checks. For example, the controller 22 may include data received from a data source 11, such as a manufacturer, that a product recall has been implemented for one or more of the items 16 in the package 14. The controller 22 can initiate a package hold command indicating that the package 14 should not be shipped to the customer until the recalled item is removed. As another example, the controller 22 may receive data from one or more data sources 11 indicating that customers have had quality concerns with one or more of the items 16 in the package 14. Accordingly, the controller 22 could initiate an additional quality control check for the suspect item. The controller 22 could also determine that the customer to whom the package 14 will be sent has a history of returning products for either legitimate or illegitimate reasons. The controller 22 could initiate an additional inspection or quality control check performed prior to shipping the package to that customer.

Another example of the controller 22 identifying when a package 14 is not ready for shipment to a customer could involve gift wrapping or over-wrapping. The controller 22 may compare the actual data about the package to expected data. If the expected data shows the package should have been gift wrapped or over-wrapped (e.g., wrapped with two or more layers), but the actual data indicates the package has not been wrapped or over-wrapped, the package 14 is not ready for shipping. Accordingly, the package 14 should be kicked out (as discussed below) for reprocessing. In one embodiment, the controller 22 could also determine that the package 14 does not weigh enough based upon the actual weight data so as to indicate that the wrapping or over-wrapping has not been completed.

In another embodiment, the system 10 could include an optical system 21 with at least one optical sensor 23 that could be used to determine whether the package 14 has been properly wrapped. Further, the optical system 21 could even be used to determine whether the correct wrapping paper was used for the package. For example, a customer could request a package be gift-wrapped in paper having a message, such as "Happy Birthday." The scale 34 may not be able to tell if the correct paper was used, but the optical system 21 could. If the package was incorrectly wrapped, the controller 22 would cause the package to be kicked out. The controller 22 could also provide automatic feedback information to a gift wrap station (not shown in FIG. 2) about the returning package or instructions for wrapping of subsequent packages 14.

In another example, the controller 22 may be configured to determine if the package 14 is ready to ship based upon ORMD or other shipping restrictions. The controller 22 can be configured to have a database with any ORMD data about each item available to a customer. If any item 16 in a package 14 has an ORMD designation that requires an ORMD label on the exterior of the package, the controller 22 can activate the labeler 36 to print and apply the required ORMD label to the package.

The controller 22 can also be configured to determine if the combination of items 16 in the package 14 require an ORMD designation or other potentially hazardous condition concern labeling, even if the items individually would not cause such a concern. As an example, a package may not require an ORMD designation if it contains only one of a bottle of perfume, or a hammer, or a welder's striker. But the combination of the perfume, the hammer, and the welder's striker could create a potentially hazardous combination subject to an ORMD designation. If the controller 22 determines that the combination of items 16 creates such an ORMD designation, the controller could automatically direct the labeler 36 to apply the required ORMD label. The controller 22 can also determine whether the intended shipping method is acceptable or if the package should be kicked out to the kickout station (discussed in greater detail below) for further processing or quality-control checks.

The controller 22 can also be configured to provide worker performance safeguards in addition to accuracy and quality control safeguards. The controller 22 can be configured to monitor and analyze historical data about packages 14 kicked-out from the processing path 20 prior to shipping. The controller 22 can track the reasons for package kickout and the customer associated with those packages. For example, if packages 14 for a particular customer are kicked out for being overweight, the controller 22 can analyze the data related to those packages, the reasons for the kickout, and the operators involved in processing the packages. The controller can also be configured to generate a notice or warning when the data related to the kickouts indicates that further investigation may be warranted. As an example, if multiple packages for the same customer are kicked out for being overweight, the contents of the packages could be inspected to determine what is causing the overweight condition. A follow-up investigation could potentially identify that a worker has been intentionally adding high value items to the packages 14 for shipment to a friend (i.e., customer) without paying for the items. The investigation could on the other hand identify that there is a significant training issue with a worker resulting in honest errors that occur when fulfilling the customer orders.

If the controller 22 determines that the actual data and the expected data sufficiently match, and all other data indicates the package is ready for shipping, the labeler 36 prints and applies a shipping label 40 to the top of the package. The shipping label 40 includes human-readable data and a bar code 42 or other machine-readable indicator (e.g., symbology) related to the shipping information (e.g., the addressee, the address, postage, etc.) for the particular package 14. The controller 22 may also have other data, such as the type discussed above, indicating that the package 14 is not yet ready for shipping.

If the controller 22 determines that actual data related to the processing steps applied to the package 14 does not match the expected data, the package may not be ready for shipping to the customer because of a processing error. In such cases, the controller 22 signals to the labeler 36 to print and apply a kickout label 44 to the top of the package 14. After the labeler 36 applies the kickout label 44, the package 14 continues along the processing path 20 past a second reader 45 that scans the newly applied label 38 for verification. The second reader 45 is coupled to the controller 22 and is adjacent to a package diverter 46, which is also coupled to the controller 22. If the second reader 45 scans the kickout label 44 or fails to read the label 38, the controller 22 activates the package diverter 46. The package diverter 46 physically directs the package 14 away from the processing path 20 to a kickout path 47, which leads to a kickout station 48. The kickout label 44, as discussed in greater detail below, assists operators at the kickout station 48 to identify and correct the processing error for the particular kicked-out package 14. If the package diverter 46 is not activated, the package 14 with its shipping label 40 in place will continue along the processing path 20 to the shipping station 49.

The controller 22 also has a kickout tool 100 to assist the operators in accurately reprocessing the kicked-out packages 14. The kickout tool 100, which can be implemented as a software program running on the controller 22, can analyze kickout data and provide feedback information about the error or other reason for package kickout. When appropriate, the kickout tool 100 can automatically modify the package processing system 10 to correct a root cause of the error resulting in kicked-out packages. Accordingly, the kickout tool 100 increases the accuracy and efficiency of the package processing system 10 and provides a self-correcting feature for the system to minimize the number of kicked-out packages.

In one embodiment, when the controller 22 determines that the actual and expected processing data for a package 14 do not sufficiently match, the kickout tool 100 is activated and identifies the apparent error based upon the incongruity of the processing data. The kickout tool 100 is also activated when data from the processing stations or other upstream or downstream data sources 11 (FIG. 1) indicate that the package is associated with at least a potential error and requires further quality control (QC) checks or otherwise is not ready for shipment. The kickout tool 100 has a table that correlates the error or QC check to a kickout description. Each kickout description is classified as one of a plurality of "kickout types." Each kickout description is also assigned one of a plurality of kickout codes. An example of an Error/Description Code table in one embodiment is shown below in Table 1.

TABLE 1

Error/Description Code Table

| Error/QC Check | Kickout Type | Kickout Code | Kickout Description |
|---|---|---|---|
| Cannot assign ship method | Process | 100 | System cannot assign a ship method. |
| Not in a shippable condition or recognized problem condition | Process | 101 | Not in a shippable condition. This package was put in condition <condition> by <worker> on <date/time>. |
| Cond 5 | Process | 105 | Not in a shippable condition. This package was put in condition <condition> by <worker> on <date/time>. |
| Cond 13 | Process | 113 | This shipment went through system or scan packages on <date>. |
| Cond 15 | Process | 115 | Not in shippable condition. This package was put in condition <condition> by <worker> on <date/time>. |

TABLE 1-continued

Error/Description Code Table

| Error/QC Check | Kickout Type | Kickout Code | Kickout Description |
|---|---|---|---|
| Scanner 1 did not read sp00 (i.e., package identification code) | Hardware | 200 | Scanner 1 did not read sp00. If bar code is good, return to processing line. |
| Scale did not send weight | Hardware | 201 | Scale did not return weight. |
| Scale sent weight beyond package limits | Hardware | 202 | Scale sent weight beyond package limits. |
| Malformed data from System | Hardware | 203 | Malformed data from System unit/station. |
| Cannot get data from System | Hardware | 204 | Cannot get data from System unit/station. |
| Box too light | AutoCheck Weight | 400 | Box too light. Check if empty and verify contents. |
| Weight out of tolerance | AutoCheck Weight | 401 | Package weight out of tolerance. The contents of the package may be incorrect. |
| Needs gift wrap (cond 11) | Gift Wrap | 500 | This package needs to be gift-wrapped. It is in a NON-SHIPPABLE condition. |
| Needs two shipping labels | Scan Packages | 600 | DHL_WPX Use scan-packages. |
| Needs two shipping labels | Scan Packages | 601 | UPS_EXPRESS Use scan-packages. |
| Too Long to Process Shipment | Slow Processing | 700 | Too long to process shipment. |
| License plate has no package | Misc | 901 | License Plate has no package assigned to it. |
| Ship option invalid | Misc | 903 | Shipment Ship Option is invalid. |
| Shipment has no bin items | Misc | 905 | Shipment has no bin items. Set aside and call a programmer. |
| Kickout Forced By Command Line (i.e., manual override at a controller station) | Misc | 907 | Kickout of this ship method specified on command line. |
| Cannot Get Tracking ID | Misc | 908 | Cannot get tracking ID for this shipment. |
| Cannot get courier routing number | Misc | 909 | Could not get Courier Routing Code. |
| Cannot Set Shipment Condition | Misc | 910 | Cannot set shipment condition for shipment. |
| Cannot Print Label | Misc | 911 | Cannot print the label for shipment. |
| Cannot get label template | Misc | 912 | Cannot get the label template for shipment. |
| Ship method has no label | Misc | 913 | Ship Method does not have a shipping label. |
| Cannot get address for shipment | Misc | 914 | Cannot get address for shipment. |
| Cannot Set Sorting Lane | Misc | 915 | Cannot set sort lane. |
| Unknown shipment-id | Misc | 918 | Unknown shipment ID. |
| Cannot create shipment | Misc | 919 | Cannot create customer shipment package in database. |
| Cannot save package info | Misc | 920 | Cannot save package information. |

The kickout tool 100 also has a table that correlates each kickout type with an instruction for correcting the error or for further processing of the package. For example, all errors classified as a "Hardware" kickout type are assigned the instruction for the operator to notify the department responsible for maintaining the hardware in the processing line and to resend the package through the processing line. One example of the table in the kickout tool 100 correlating kickout types with kickout instructions is provided below in Table 2.

TABLE 2

Instructions for Kickout Types

| Kickout Type | Instruction |
| --- | --- |
| Process | Take this package to Problem Solve Station. |
| Hardware | HARDWARE FAILURE. NOTIFY FACILITIES. Resend through line. |
| AutoCheck Weight | Process with Kickout Tool. |
| Gift Wrap | Return this package to gift wrap. |
| Use Scan Packages | Use Scan Packages. |
| Shipping | Take to Shipping Problem Solve Station. |
| Slow Processing | If problem persists contact AM/Snoc to issue remedy ticket. |
| Miscellaneous | Take this package to Problem Solve Station. |

In Table 2, the instruction "Process with Kickout Tool" refers to running a diagnostic subroutine for the package kicked out because of the Auto Check Weight system. The diagnostic subroutine directs the user on what to do with the package to determine the reason the package was kicked out and the steps needed to put the package into condition for shipping. The instructions "Use Scan Packages" refers to running a subroutine that directs a user through manual processing steps, such as scanning the package, weighing, and/or applying a specific label to the package. The instructions related to the "Slow Processing" kickout type refers to contacting AM/Snoc to issue a remedy ticket. This instruction is system-specific and directs the user to contact an area manager of a selected technical support group.

Information from the tables related to the incongruity in the actual and expected data about package processing or about the need for further processing is provided on the kickout label 44. The same information can be provided to operators at a selected station 18 along the processing path. The information can also be provided as appropriate to other upstream or downstream locations in the value chain, as discussed above. In one embodiment, the kickout tool 100 is coupled to a computer display or other selected user interface accessible by an operator at a selected station 18. The information can be provided in both a human-readable format and a machine-readable format. Accordingly, the operator can process the package by reading the information from the display or from the kickout label 44.

Figure 3:
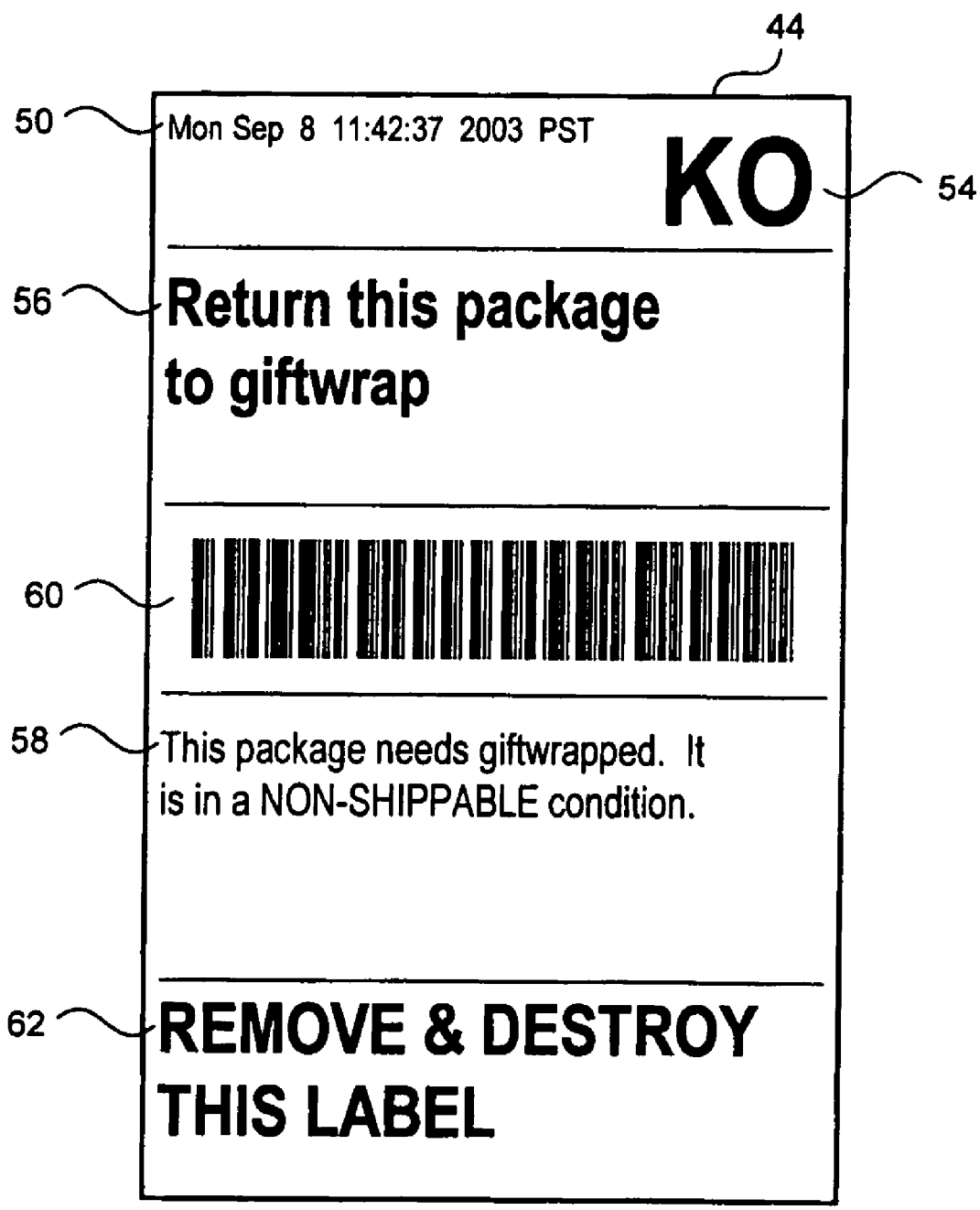
FIG. 3 is an enlarged view of one kickout label that can be applied to a package at the labeling station of FIG. 2.

FIG. 3 is an enlarged view of one example of a kickout label 44 that can be applied to the top of the package 14. The kickout label 44 has a variety of data printed on different parts of it. The illustrated kickout label 44 includes date/time information 50 along the upper left-hand corner area of the label. The date/time information identifies in human-readable format when the kickout label 44 was printed. The kickout label 44 can also have the station location where the kickout error occurred. In the illustrated embodiment, a large label identifier 54 is printed in the upper right-hand corner indicating the label is a kickout label 44. The label identifier 54 is a large font "KO," which allows a person to quickly and visually identify that the label is a kickout label 44.

The kickout label 44 also includes in human-readable format the instructions 56 corresponding to the kickout type for the apparent error or QC check causing the kickout. The instructions tell the operator what to do with the package 14 to correct the kickout error or to initiate the QC check. In the illustrated embodiment, the instructions 56 direct the operator to return the package 14 to "Gift Wrap" so the package can be gift-wrapped per customer request. As seen in Table 2, the instructions are written in a concise, sentence-type format that provides easily understood instructions for the operator handling the kicked-out package. The instructions 56 in Table 2 are illustrative, although the controller 22 and kickout tool 100 can be programmed to print the kickout label 44 with a variety of clear instructions written in human-readable format.

In the illustrated embodiment, the kickout description from Table 1 is also printed in a human-readable format on the kickout label 44. The kickout description 58 is also printed in a sentence-type format to provide clear, concise information to a reader about why the package 14 was kicked out. The kickout label 44 also includes a bar code 60 or other selected machine-readable identifier. The bar code 60 provides a unique identifier for the package to link the kicked-out package to data about the error or QC check causing the kickout, the date/time information, the station location, the kickout type, and the kickout description. The bar code 60 can be scanned by a reader 26 coupled to the kickout tool 100 to provide instant access to this kickout information. The package 14 and its related information can also be tracked via the bar code 60 through subsequent processing steps. The kickout label 44 also includes an instruction 62 to "remove and destroy" the kickout label after the package has been reprocessed to address the error.

The kickout tool 100 and the kickout labels 44 are designed to clearly guide an operator through the kickout resolution process so that no special expertise is required to at least initially process kicked-out packages 14. The kickout tool 100 is also configured to track the correction steps taken by the operators to reprocess the kicked-out package 14 and the information or data related to those corrective process steps. Accordingly, after the kicked-out package 14 has been reprocessed and data about the reprocessing is provided to the controller 22, the kickout label 44 is removed and the package can be introduced into the processing path 20 at a selected location. The package 14 can then be processed along the normal processing path 20, moved through the labeling station 12, labeled with the shipping label 40 if appropriate and moved to the shipping station 49.

Figure 4:
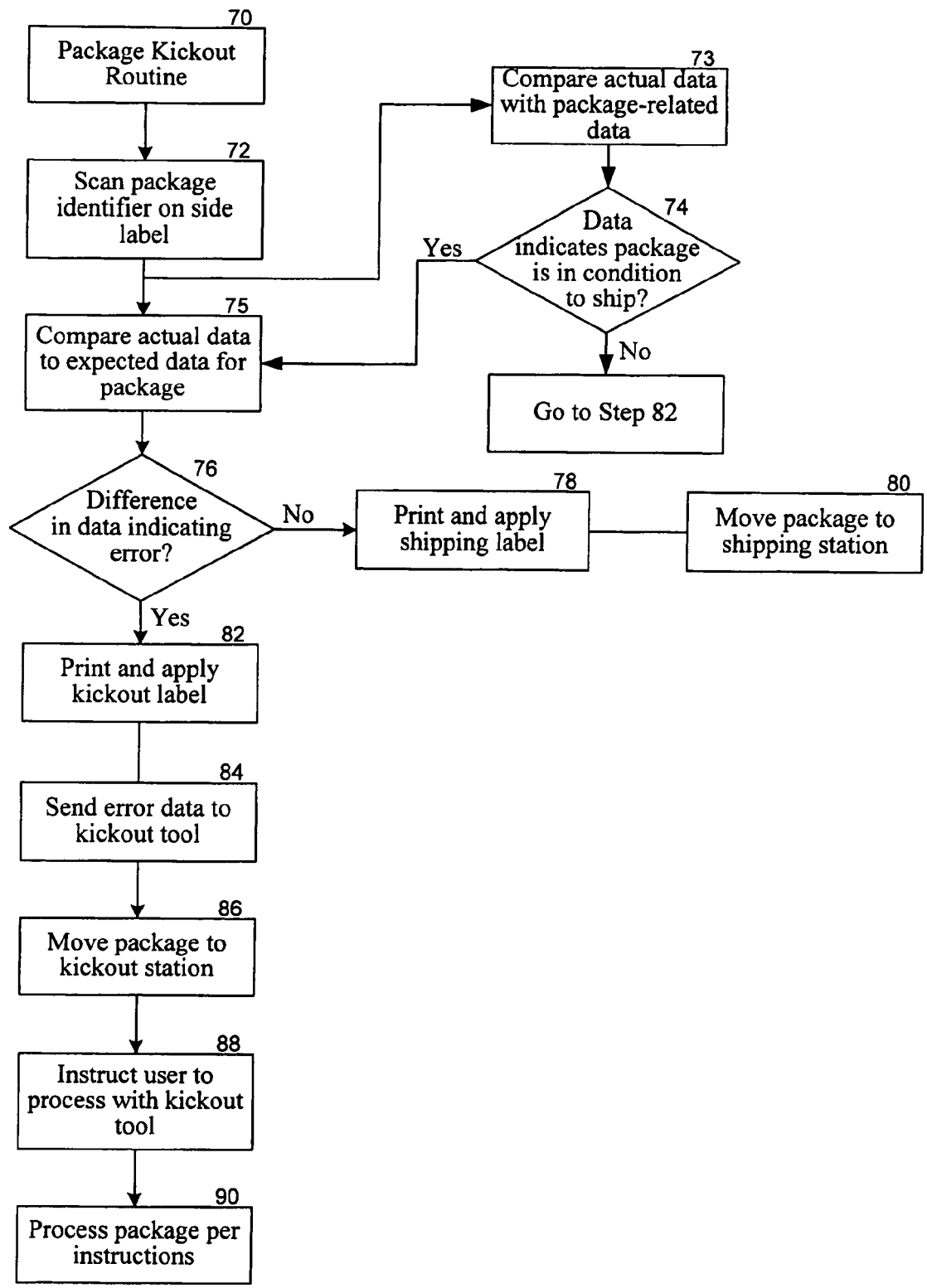
FIG. 4 is a flow diagram of an embodiment of a Package Kickout Routine for the system of FIG. 2.

FIG. 4 is a flow diagram of one embodiment of a Package Kickout Routine 70 of the kickout tool 100. The following description of the Package Kickout Routine 70 will refer by reference number to the steps of the routine shown in FIG. 4 and will refer by reference number to the system components shown in FIG. 2 and discussed above. The Package Kickout Routine 70 is applied when the package 14 enters the labeling station 12. Under the routine in step 72, a reader 26 detects the identifier, such as a bar code, on the side label 24. The controller 22 retrieves information about the package 14 associated with the detected identifier. In another embodiment using RFID tags as the identifiers, the controller 22 retrieves the information about the package 14 and the items 16 associated with the RFID tags.

In step 73, the controller 22 analyzes the data related to the package 14, the items 16, and the actual processing steps to data to determine whether any data indicates that the package is not ready for shipment. For example, the controller 22 can analyze data related to a dimensional analysis, a fragility analysis, a quality control analysis, or an ORMD/hazardous material analysis. The controller 22 can also analyze the data from any one of the data sources 11 (FIG. 1) regarding the package 14 or items 16 in the package. The controller determines in step 74 whether the data indicates the package 14 is not ready to be shipped. If, based upon the actual data, the controller 22 indicates the package 14 appears ready to be shipped, the controller moves to step 75 (discussed below) to compare the actual and expected data about the package. If the controller 22 determines that the package 14 is not ready to ship, the controller moves to step 82 to generate a kickout label. In one embodiment, if the controller 22 determines in step 74 that the package 14 is not ready to ship, the controller continues with the comparison in step 75 (discussed below) to determine if there may be multiple reasons why the package is not yet ready to ship.

In step 75, the controller 22 compares the data related to the actual processing steps performed on the package 14 to the expected processing steps for that package. The controller 22 determines in step 76 whether there is a sufficient difference between the actual data and the expected data to indicate that an error occurred in processing of the package 14. If the actual data sufficiently matches the expected data and no additional QC checks or processing is needed prior to shipping the package, the controller 22 in step 78 activates the labeler 36 to print and apply a shipping label 40 to the top of the package 14. In step 80, the package 14 is then moved along the processing path 20 to the shipping station 49 for final processing and shipment to the customer. In one embodiment, if the controller 22 determines that the package 14 requires an ORMD designation label or other hazardous material label, but otherwise the package is in acceptable condition for shipping, the controller 22 activates the labeler 36 to apply the required label to the package. The controller 22 also activates the labeler 36 to apply the shipping label to the package, so the package can continue to the shipping station 49.

If, in step 76, the controller 22 identifies a sufficient difference between the package's actual data and expected data, the controller in step 82 activates the labeler 36 to print and apply the kickout label 44 to the top of the package. Similarly, if in step 74 the controller 22 determines that one or more additional QC checks or processing steps are needed, the controller in step 82 activates the labeler 36 to print and apply the kickout label 44. In step 84, the controller 22 also provides error/QC check data to the kickout tool 100 if the package's actual data is sufficiently different from the expected data or if data indicates a QC check or further processing is needed for the package 14. In step 86, the package 14 is then diverted from the processing path 20 to the kickout path 47 and moved to the kickout station 48.

After the package 14 is moved to the kickout station 48, in step 88 the operator at the kickout station is instructed on what to do with the package to address the error or other reason for package kickout. In one embodiment, the operator is instructed via the human-readable text on the kickout label 44. The operator can also be instructed by providing written or symbolic instructions from the kickout tool 100 to a display screen on a station-mounted or hand-held computer. The kickout tool 100 in the illustrated embodiment would provide the same date/time information, instructions, and kickout description to the user interface as is provided on the kickout label 44. In step 90, the operator then processes the package 14 in accordance with the instructions from the kickout label 44 and the kickout tool 100 for that particular package.

Figure 5:
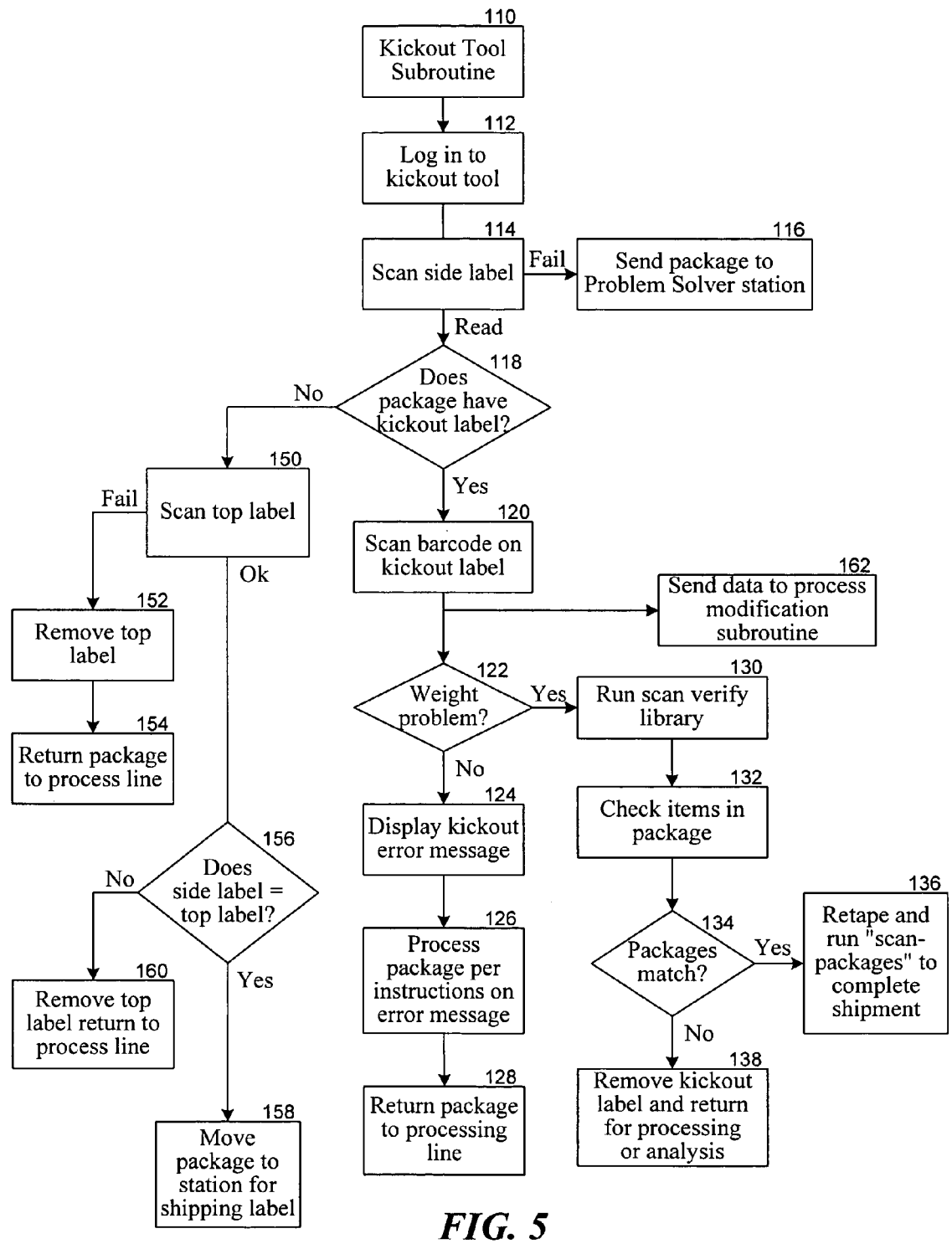
FIG. 5 is a flow diagram of an embodiment of a Kickout Tool Subroutine for the system of FIG. 2.

FIG. 5 is a flow diagram of an embodiment of a Kickout Tool Subroutine 110 used by the kickout tool 100. The following description of the Kickout Tool Subroutine 110 refers to application of the subroutine at the kickout station and refers by reference number to the steps of the subroutine shown in FIG. 5 and refers to the system components shown in FIGS. 1 and 2 discussed above. In step 112, when the operator at the kickout station begins processing the kicked-out package, the operator logs into the kickout tool 100. In step 114, the operator scans or otherwise reads the side label 24 of the kicked-out package 14. If scanning of the side label 24 in step 114 fails, a message is provided to the operator in step 116 to send the package to the Problem Solver station for manual analysis. If scanning of the side label 24 in step 114 is successful, the kickout tool 100 in step 118 queries the operator to determine whether the package 14 has a kickout label 44. If the package 14 has a kickout label 44, step 120 instructs the operator to scan the bar code 60 or other identifier on the kickout label. While the current example is described in connection with bar codes and the scanning thereof, other examples use other identifiers and identification devices to detect which package 14 and/or contents are being examined.

In step 122 the kickout tool 100 determines whether the error was a weight problem. If the error was not related to a weight problem, in step 124 the kickout tool 100 displays a kickout error message that includes the kickout description 58 and the instructions 56 for processing the kicked-out package. In step 126, the operator then processes the kicked-out package per the instructions in the error message. As indicated above, those instructions can include taking the package 14 to a separate station 18 to resolve a specific issue, to initiate analysis of a hardware failure, or to re-run the package through the processing line. The instructions could also direct the operator, as examples, to use a separate subroutine for error analysis, for further QC processing, or for adding shipping information. In one embodiment, the instructions may indicate that additional shipping information is needed if, as an example, the product is to be shipped using an express courier service or to be shipped to a particular geographic location, such as to Puerto Rico or Samoa. After the package 14 is processed per step 126, the package in step 128 is reintroduced into the processing line at a selected station 18.

If the Kickout Tool Subroutine 110 determines in step 122 that the error was caused due to a weight problem, in step 130 the operator runs a scan-and-verify subroutine to determine what items 16 should have been packed into the package 14. In some embodiments the scan-and-verify subroutine can be part of the kickout tool 100, although in other embodiments the subroutine can be independent of the kickout out tool. In step 132, the operator checks the package contents and compares the actual contents with the expected contents. In step 134, the kickout tool 100 queries the operator whether the actual contents of the package 14 match the expected contents. If the actual package contents match the expected contents, the kickout tool 100 will query the operator regarding other quality control checks, such as to determine if the package appears to have sufficient damage. The kickout tool 100 can also be instructed to direct the package to an identified station for a more thorough analysis. Alternately, in step 136 the operator can be instructed to retape and scan the package 14 for reintroduction to the processing path 20 at a designated location for completion of the shipment process.

In one embodiment, the operator provides input to the controller 22 or to the kickout tool 100 indicating the actual contents matched the expected contents. The controller or kickout 100 can create a feedback loop to initiate an evaluation of the historical records related to the particular package. As an example, the feedback loop can include an evaluation of the actual and expected weight data to determine whether the data indicates a repeating error associated with an expected weight of one or more of the items. The feedback loop can also analyze the dimensional data or fragility data if the error was caused from the use of a larger or smaller shipping box or an unexpected amount of dunnage. The controller can also provide automated feedback to one or more of the data sources 11, regarding incorrect or potentially incorrect data it provided to the controller.

In one embodiment, the controller 22 analyzes the historical data related to common elements of kicked-out packages and, when appropriate, automatically provides a self-correcting modification to the expected data in the controller 22 or processor instructions. Accordingly, the self-correction of the system will prevent unnecessary kickouts of packages with similar characteristics. This self-correcting feature can increase and maintain the efficiency of the system over time while requiring a minimum amount of manual intervention.

If the actual contents in a package 14 do not match the expected contents, in step 138 the operator removes the kickout label and directs the package to the proper location for further processing or analysis. The package 14 can be reintroduced into the processing path at a designated location so the package can then be processed or reprocessed in accordance with the regular package processing procedures.

Returning to step 118 of the Kickout Tool Subroutine 110, if the package 14 does not have a kickout label 44, in step 150 the top label 25 of the package is scanned to read the bar code or other symbology. If scanning the top label 25 fails, in step 152 the operator removes the top label and in step 154 returns the package to a designated station 18 in the processing line, such as the station where a top label is to be applied. The package 14 can then be reprocessed through the normal processing procedure.

If scanning the top label 25 is successful, in step 156 the operator is queried about whether the data on the side label 24 is consistent with the data on the top label 25. If the data on the side label 24 is sufficiently the same as the data on the top label 25, in step 158 the package 14 is returned to the labeling station 12 for the application of a shipping label 40 in preparation of being shipped to the customer. If the data on the side label 24 does not sufficiently match the data on the top label 25, in step 160 the operator removes the top label from the package and returns the package to a designated location along the processing path 20.

Figure 6:
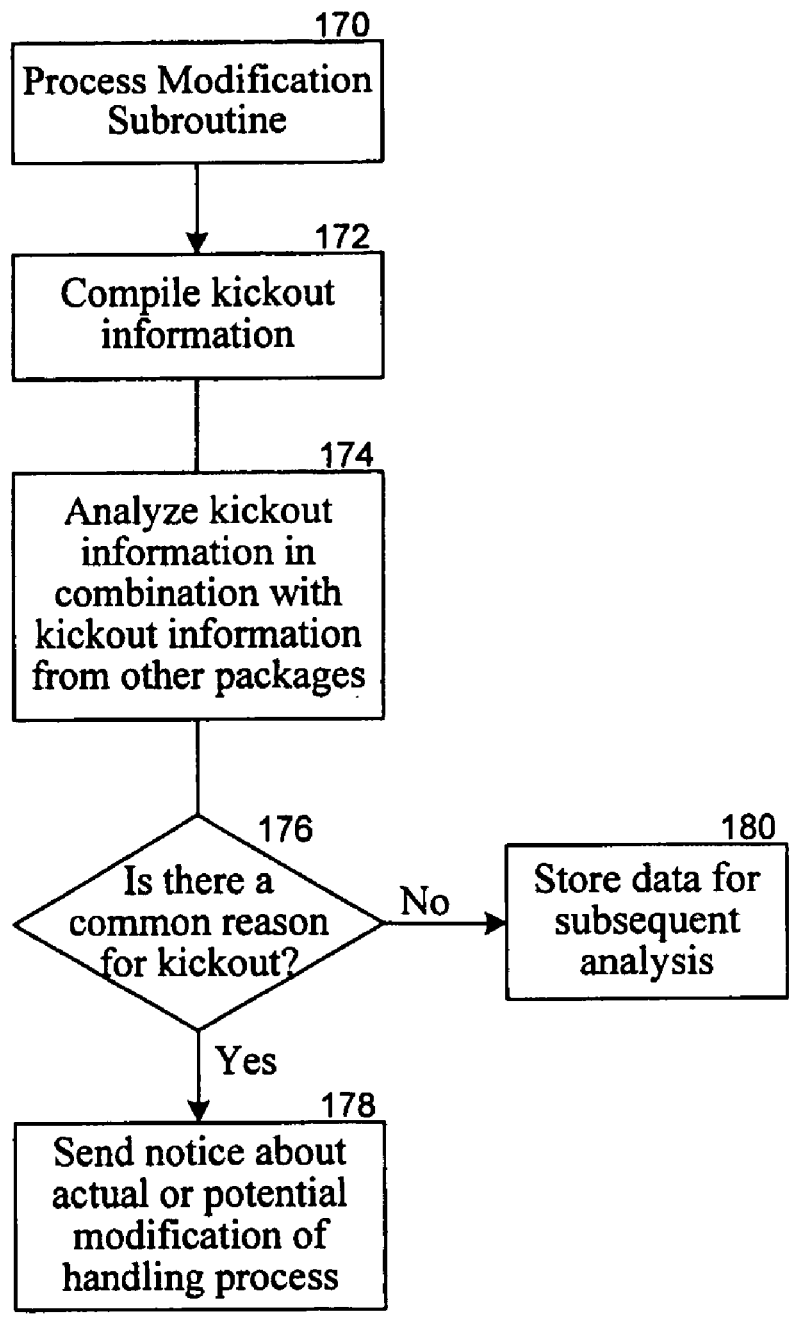
FIG. 6 is a flow diagram of an embodiment of a Process Modification Subroutine for the system of FIG. 2.

In addition to processing the kicked-out package for resolution of the error, the Kickout Tool Subroutine 110 in step 162 also compiles and sends data related to the error to a Process Modification Subroutine. FIG. 6 is a flow chart of an embodiment of a Process Modification Subroutine 170. The kickout tool 100 uses this subroutine to provide self-correcting feedback loops and feed forward loops that can automatically modify the processing system to correct the root cause of processing errors. The process modification subroutine 170 can also be configured to automatically update data used by the controller 22 to help increase accuracy and efficiency of the package processing system. Accordingly, this automatic modification will help alleviate future kickout of packages 14 for the same problem.

As best seen in FIG. 6, the Process Modification Subroutine 170 begins in step 174, wherein the kickout tool 100 analyzes kickout information related to a kicked-out package 14 and kickout information related to other packages. At step 176, the kickout tool 100 determines whether there appears to be a common reason, quality control check, or error for the kicked-out packages from the processing line. As an example, the kickout tool 100 may determine that a common reason for package kickout is a human error, such as if packages are not being gift-wrapped or over-wrapped by an operator working at a particular wrapping station. As another example, the kickout tool 100 may determine that there is a hardware failure, such as a malfunction in a scanner at an identified location in the package processing path.

If the Process Modification Subroutine 170 determines at step 176 that there is a common error, in step 178 the kickout tool 100 will automatically send to a particular station 18 a notice about an actual or potential modification of the package processing system 10. The modification can be automatically implemented or investigated to correct the root cause of the error causing package kickout. In one embodiment, the kickout tool 100 is also configured to send data or initiate an inquiry or data check to one or more of the upstream or downstream clients. As an example, the kickout tool 100 may determine that a particular product is consistently underweight or overweight, which results in the kickout of packages containing the product. The kickout tool 100 can automatically initiate a communication via the controller 22 to the vendor requesting updated weight data for the product at issue.

The kickout tool 100 can also be configured to initiate communications to a customer if the reason package-kickout requires. As an example, if the package kicked out because of a product recall from a manufacturer, the kickout tool 100 can initiate a communication to the customer informing them of the recall and options available for alternate products. Similarly, a notice to a customer may be initiated if, as an example, the package cannot be shipped via air courier and must be delivered by ground or sea courier. Accordingly, the kickout tool 100 is configured to provide the automatic feedback or feed forward loop for self-correcting the package handling process and for automatic initiation of communication.

If at step 176 there is not a common reason for the package kickout, the kickout tool 100 at step 180 stores the data regarding the kicked-out package 14. The stored data is usable by the kickout tool 100 for subsequent analysis and comparison with other data related to other kicked-out packages. The kickout tool 100 can also provide reports or other compilations related to kicked-out packages. For example, the kickout tool 100 can provide reports of the date/time, the station where the error occurred, and the kickout descriptions, as discussed above. The reports or other compilation of the data can be provided in a tangible medium for analysis. The reports can summarize, as an example, the efficiency and effectiveness of the package handling process, or where any improvements in the process could be made. The kickout tool's report function can also be used for a variety of other purposes, such as compiling data with respect to employee performance while working on the package processing line.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form.

What is claimed is:

1. A self-correcting package handling system for use with a plurality of packages having heterogeneous contents, each of the packages having package identification related to that package, comprising:
 a processing path having a direction of travel and a plurality of processing stations including a labeling station;
 an identifier situated proximate to the path at the labeling station;
 a controller coupled to the identifier to receive package data related to the package identification for a package, the controller having first and second package data, the first package data being related to an actual condition of the package, and the second package data being related to an expected condition of the package; and
 an analyzer coupled to the controller and configured to receive third data related to the first and second package data, the analyzer processing the third data related to the package and third data related to other packages and automatically determining whether a modification is needed in the package handling process, the analyzer configured to automatically initiate the modification to the package handling process.

2. The system of claim 1, further comprising a scale coupled to the controller and positioned to weigh the package and provide weight data related to the package to the controller.

3. The system of claim 1 wherein the controller is coupled to remote data sources and is configured to provide feedback data to one or more of the data sources.

4. The system of claim 1, further comprising a package diverter coupled to the controller and configured to direct the package along a kickout path away from a processing path.

5. The system of claim 1 wherein the controller has access to data related to dimensions of items to be contained in the package and data related to a plurality of shipping containers of different sizes, the controller provides a dimensional analysis of the items to be contained in the package and of the shipping containers.

6. The system of claim 1 wherein the controller has access to data related to fragility of items to be contained in the package, the controller provides a fragility analysis related to packing of the items.

7. The system of claim 1 wherein the controller has access to ORMD-related data for items to be contained in the package, the controller provides an ORMD analysis to determine if an ORMD designation is required for the package containing a combination of the items.

8. The system of claim 1 wherein the controller is configured to provide a combination of quality checks that include a first quality check independently indicating the package is ready for shipping, and a second quality check independently indicating the package is ready for shipping, and the combination of the first and second quality checks together indicating that the package is not ready for shipping.

9. The system of claim 1 wherein the controller is configured to provide a shipping mode analysis for a package wherein the first package data includes data related to an intended shipping mode for the package, the controller automatically determines if a modification to the intended shipping mode is needed.

10. The system of claim 1 wherein the controller is configured to provide a branding analysis for a package wherein the package is to be shipped under one of a plurality of brand names, the controller determining whether the package improperly contains brand information not related to the one of the plurality of brand names.

11. A processing system for packages each having a package identification associated therewith, the processing system being coupled to a plurality of remote independent data sources, comprising:
 processing stations where packages having heterogeneous contents are processed in preparation for transport to a destination, the processing stations having one or more data input devices;
 an identifier at at least one of the processing stations to detect the package identifications associated with the packages; and
 a controller coupled to the identifier to receive data related to the package identification detected by the identifier, the controller coupled to one of the data input devices to receive first package data related to an actual condition of the package, the controller having second package data related to acceptable package conditions required prior to completed processing of the package, the controller being configured to use the first and second package data to determine if the package is in a condition requiring further processing or in acceptable condition, the controller being configured to receive the second package data from the independent data sources for comparison with the first package data to the second package data, the controller configured to automatically initiate processing instructions related to the processing of the package or to automatically initiate communication with at least one of the data sources.

12. The system of claim 11 wherein the controller is configured to compare the first and second package data and to automatically initiate a communication related to modification of the second package data or to a package processing procedure.

13. The system of claim 11, further comprising package director coupled to the controller and positioned to direct the package along a kickout path if the package is in the condition requiring further processing.

14. The system of claim 11, further comprising a scale coupled to the controller and positioned to weigh the package identified and provide to the controller weight data related to the package.

15. The system of claim 11, further comprising a labeler coupled to the controller and configured to apply a first label to the package if the controller determines that the package is in an acceptable condition, the labeler configured to apply a second label to the package if the controller determines that the package is in a condition requiring further processing, the second label having machine-readable data relating to instructions for further processing of the package.

16. The system of claim 15 wherein the first label is a shipping label with shipping information about the package, and the second label is a kickout label.

17. The system of claim 11, further comprising a labeler coupled to the controller, the controller being configured to cause the labeler to apply a first label to the package if the controller determines that the package is in an accepted condition, the controller being configured to cause the labeler to apply a second label to the package if the controller determines that the package is in a condition requiring further processing.

18. The system of claim 11 wherein the controller provides a collection of data related to packages identified as being in the condition requiring additional processing, the collection of data being reducible into a tangible medium in human-readable form.

19. The system of claim 11 wherein the controller provides feedback data in at least one of a human-readable and a machine-readable format relating to the modification in the package handling process.

20. The system of claim 11 wherein the package identification on each package is a symbology, and the identifier is a symbology reader.

21. The system of claim 11 wherein the package identification on each package is an RFID tag, and the identifier is an RFID reader.

22. The system of claim 11 wherein the controller is configured to analyze the first and second package data and automatically provide instructions related to processing of packages to one or more of the processing stations.

23. The system of claim 11 wherein the controller includes data related to dimensions of items to be contained in the package and data related to a plurality of shipping containers of different sizes, and the controller provides a dimensional analysis of the items to be contained in the package and of the shipping containers.

24. The system of claim 11 wherein the controller includes data related to fragility of items to be contained in the package, and the controller provides a fragility analysis related to packing of the items.

25. The system of claim 11 wherein the controller includes ORMD-related data for items to be contained in the package, and the controller provides an ORMD analysis to determine if an ORMD designation is required for the package containing a combination of the items even if none of the items in the package independently would require an ORMD designation.

26. The system of claim 11 wherein the controller includes ORMD-related data for items to be contained in the package, and the controller provides an ORMD analysis to determine if an ORMD designation is required for the package.

27. The system of claim 11 wherein the controller is configured to provide a combination of quality checks that includes a first quality check independently indicating the package is ready for shipping, and a second quality check independently indicating the package is ready for shipping, and the combination of the first and second quality checks together indicating that the package is not ready for shipping.

28. The system of claim 11 wherein the controller provides a shipping mode analysis for a package wherein the first package data includes first shipping data related to an intended shipping mode for the package, and the controller automatically determines if a modification to the intended shipping mode is needed.

29. The system of claim 11 wherein the controller provides a branding analysis for a package wherein the package is to be shipped under one of a plurality of brand names, and the controller determining whether the package improperly contains brand information not related to the one of the plurality of brand names.

30. A package handling system for use with a plurality of packages having heterogeneous contents, each package having a machine-readable package identification related to that package, the system comprising:
    a controller configured to receive package data related to the package identification for each package, the controller having access to first and second package data about each package, the first package data being related to an actual condition of a package when at a location, and the second package data being related to an acceptable condition of the package when at the location, the controller comparing the first and second package data for the package; and
    an analyzer coupled to the controller and configured to receive third data related to the first and second package data, the analyzer configured to process the third data related to the package and third data related to other packages and automatically determine whether a modification is needed in the package handling process, the analyzer configured to automatically initiate a communication relating to the modification.

31. The system of claim 30, further comprising a scale coupled to the controller and positioned to weigh the package and provide weight data related to the package to the controller.

32. The system of claim 30 wherein the analyzer is configured to provide kickout data for use in a collection of data related to packages to which second labels have been applied, the collection of data being reducible into a tangible medium in human-readable format.

33. The system of claim 30 wherein the controller is coupled to remote data sources and configured to provide feedback data to one or more of the data sources.

34. A package handling system for use with a plurality of packages, each package having a machine-readable identification related to that package, the system being coupled to a plurality of independent data sources, the system comprising:
    an identifier configured to identify the machine-readable identification;
    a controller coupled to the identifier to receive package data from the reader related to the machine-readable identification related to each package, the controller having first and second package data about each package, the first package data being related to an actual condition of a package when proximate to the identifier, and the second package data being related to an acceptable condition of the package, the controller comparing the first and second package data for the package and automatically determining whether a modification or a quality control check is needed in the package handling process, the controller configured to automatically generate a communication to at least one of the data sources relating to the modification or the quality control check.

35. The system of claim 34, further comprising a labeler coupled to the controller and positioned to apply one of first and second labels to the package.

36. The system of claim 34 wherein the controller is configured to analyze the first and second package data and automatically provide instructions to one or more processing stations in the system related to processing of packages.

37. A computer-readable medium whose contents when executed by a computing system cause the computing system to perform a method, the method comprising:
    receiving, from an identifier, package identification data related to a package that is one of a plurality of packages;
    accessing first and second package data related to the package, the first package data being related to an actual condition of the package when the package is proximate to the identifier, and the second package data being related to an acceptable condition of the package;
    comparing the first and second package data;

determining whether a modification or a quality control check is needed in a package handling process; and automatically sending a communication to at least one of a plurality of independent data sources that provide information related to the second data, the communication relating to the modification or the quality control check.

38. A computer-readable medium whose contents when executed by a computing system cause the computing system to perform a package handling method, the method comprising:

receiving package identification data related to a package that is one of plurality of packages;

accessing data related to processing of the package prior to reaching a first location, the data including first data about processing steps actually applied to the package prior to the first location, and the data including second data about processing steps expected to be applied to the package prior to the first location;

comparing the first data to the second data;

determining whether the first and second data indicate the package is in an acceptable condition to move to a second location away from the first location;

determining whether the first and second data indicate the package is not in an acceptable condition to move to the second location;

causing the package to move toward a third location if the package is not in an acceptable condition;

determining, based at least in part upon the comparison of the first and second data, if a potential or actual modification is needed to a package handling process; and automatically modifying the package handling process prior to the first station to at least partially change at least one process step applied to packages prior to the first station.

39. The computer readable medium of claim 38, the method further comprising causing a first label to be applied to the package if the first and second data indicate that the package is in the acceptable condition.

40. The computer readable medium of claim 38, the method further comprising causing a second label to be applied to the package if the first and second data indicate that the package is not in the acceptable condition.

41. A package handling method, comprising:

moving a plurality of packages in a direction proximate to a processing path, each package having package identification related to that package;

identifying with an identifier the package identification when the package is proximate to a first portion of the processing path;

sending data related to the package identification from the identifier to a controller, the controller having access to data related to processing of the package, the data including first data about processing steps actually applied to the package prior to the package arriving at a first location relative to the processing path and second data about processing steps expected to be applied to the package prior to arriving at the first location;

comparing the first data to the second data;

moving the package toward a second portion of the processing path if the comparison of the first data and the second data indicates the package is in acceptable condition;

moving the package toward a third portion of the processing path if the comparison of the first data and the second data indicates that the package is in a condition requiring further processing;

providing instructions for further processing of the package if the package is moved toward the third portion of the processing path; and determining whether a modification or a quality control check is needed in a package handling process based at least in part upon the comparison between the first and second data.

42. The method of claim 41, further comprising applying a first label to the package if the package is in the acceptable condition, and applying a second label to the package if the package is in the condition requiring further processing, the second label having data thereon related to the instructions for further processing for the package.

43. The method of claim 41, further comprising automatically modifying the package handling process prior to the first station to at least partially change at least one process step applied to packages prior to the first station.

44. The method of claim 41, further comprising providing a compilation of the information in human-readable format related to packages moved toward the third portion of the processing path.

45. The method of claim 41, further comprising receiving third data from one or more independent data sources remote from the controller, the third data being at least a portion of the second data, and providing feedback information to the one or more independent data sources.

46. The method of claim 41, further comprising collecting a plurality of items to be packed in one of a plurality of containers, and conducting a dimensional analysis of the items and internal dimensions of the plurality of the containers, and selecting one of the plurality of containers, and packing the items in the selected one of the plurality of containers.

47. The method of claim 41, further comprising collecting a plurality of heterogeneous items to be packed into the package, each of the items having a fragility characteristic, conducting with the controller a fragility analysis based upon the fragility characteristics of the items, and based upon the results of the fragility analysis, determining whether the plurality of heterogeneous items can be safely packed into the one of the plurality of containers.

48. The method of claim 41, further comprising collecting a plurality of heterogeneous items to be contained in a package, at lease some of the items having an ORMD designation, conducting an ORMD analysis of the items individually and in combination, determining whether the package requires an ORMD designation based upon results of the ORMD analysis.

49. The method of claim 41 wherein identifying with an identifier the package identification includes scanning with a scanner symbology on the package.

50. The method of claim 41 wherein identifying with an identifier the identification associated with a package includes detecting with a reader an RFID tag coupled to the package.

51. The method of claim 41, further comprising automatically providing feedback information based at least in part on the first and second data to initiate at least one of a process modification or a quality control check related to one or more of the packages.

* * * * *